Aug. 22, 1939.  C. R. BUSCH  2,170,114
BRAKE BEAM STRUT
Filed Aug. 7, 1937  2 Sheets-Sheet 1
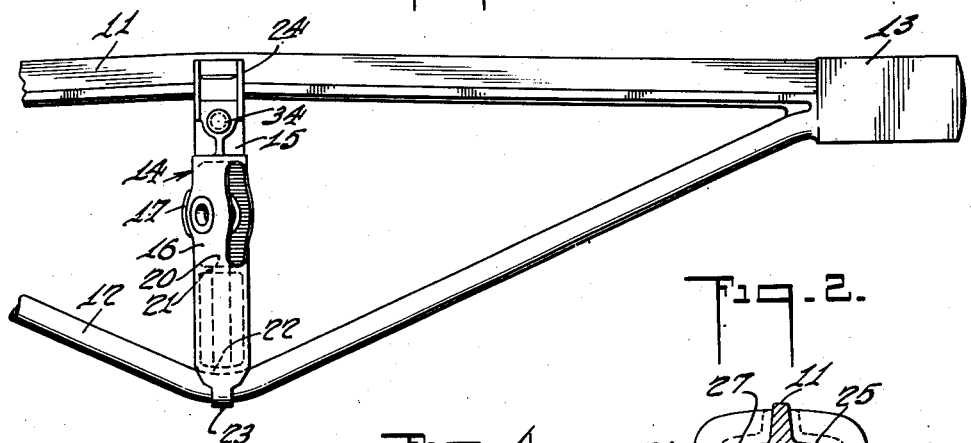
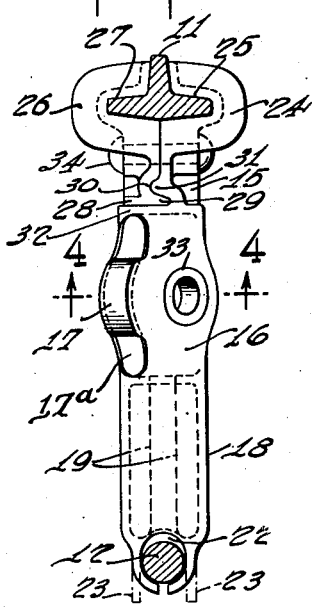
INVENTOR
Charles R. Busch.
BY
ATTORNEY Aug. 22, 1939.     C. R. BUSCH     2,170,114
BRAKE BEAM STRUT
Filed Aug. 7, 1937     2 Sheets-Sheet 2
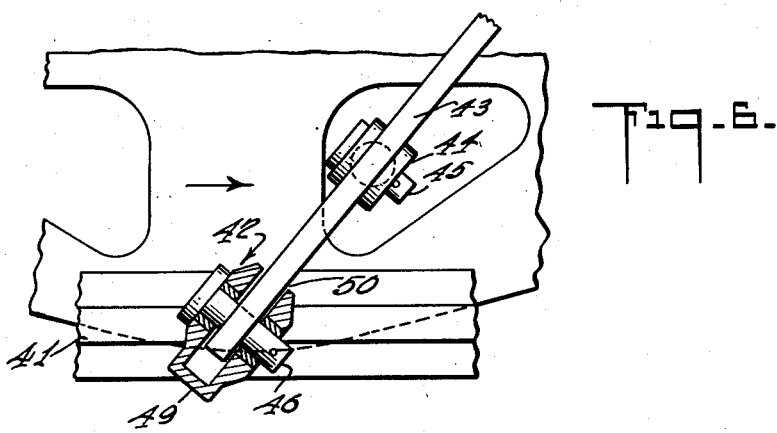
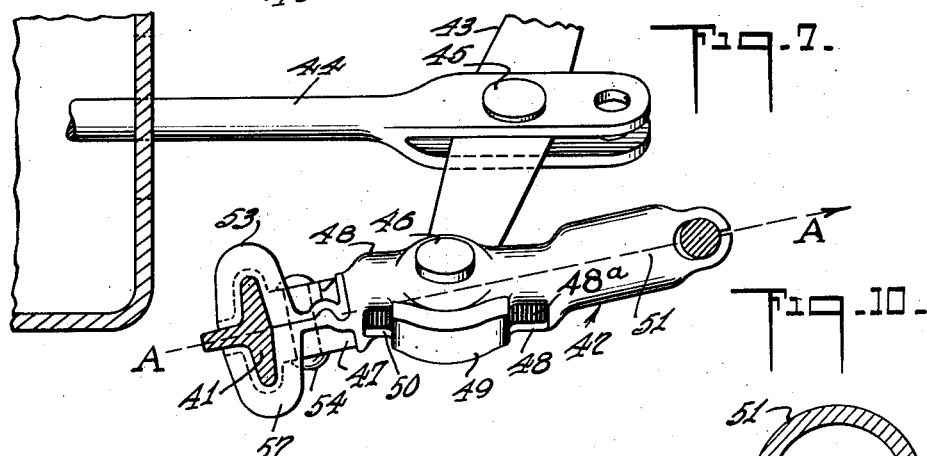
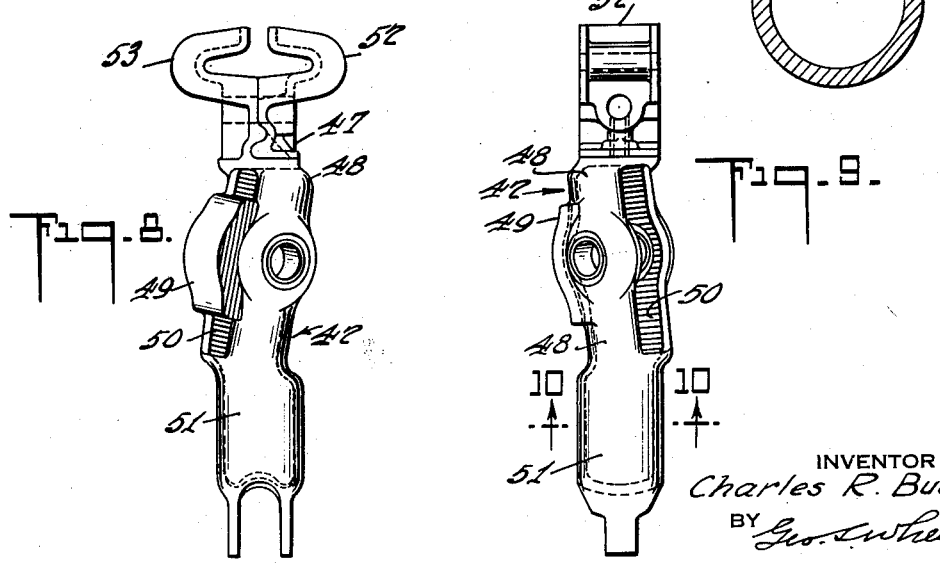
INVENTOR
Charles R. Busch.
BY
ATTORNEY Patented Aug. 22, 1939

2,170,114

UNITED STATES PATENT OFFICE 2,170,114

BRAKE BEAM STRUT

Charles R. Busch, Orange, N. J., assignor to Buffalo Brake Beam Company, New York, N. Y., a corporation of New York Application August 7, 1937, Serial No. 157,859

16 Claims. (Cl. 188—231)

The present invention relates to struts of more or less special construction intended for use in brake beams for use with railway cars, and such struts being more particularly but not necessarily for use with brake beams which apply the brakes at a suitable angle of inclination with respect to the horizontal, so that the angle of inclination is on a line with the axes of the wheels, as more particularly described in my prior application Serial No. 134,792, filed April 3, 1937, of which this application is a partial continuation.

A particular object of the present invention is to provide a specially constructed strut for a truss brake beam and which comprises a main body portion having a jaw integral therewith and a separate jaw which is adapted to cooperate with aforesaid jaw, the two members of the strut which have the jaws on them at corresponding ends being adapted to be positively and firmly united for the rigid engagement of the jaws with the compression member of the brake beam, the opposite end of the strut being adapted to be rigidly connected with the tension member of the beam.

A quite important object of the present invention, whether or not the strut has the two special jaws above referred to, is to suitably orient the strut, because it is preferred that the brake beam provided with the strut move at a suitable angle of inclination in applying and releasing the brakes. Such object is to so connect the brake lever pivotally with the strut that, in spite of the desired angle of movement of the brake beam, the pivotally connected elements will move properly and without jamming or undue friction, for otherwise such elements could not move freely in applying or releasing the brakes and possibly one of them might be distorted or even fractured and broken due to the tremendous power which is required in applying the brakes.

These being among the objects of the present invention, the same consists of suitable features of construction and combinations of parts to be hereinafter described and then claimed with reference to the accompanying drawings illustrating two embodiments thereof and wherein Fig. 1 is a plan view of a little more than one-half of a brake beam provided with an improved strut;

Fig. 2 is an enlarged transverse section of the beam showing the strut in elevation, parts being in broken lines;

Fig. 3 is a transverse section of that end of the strut which is adjacent the tension member of the beam;

Fig. 4 is an enlarged transverse section of the strut on line 4—4, Fig. 2, looking in the direction of the arrows, parts being indicated in broken lines;

Fig. 5 is an elevation, partly in section, and parts broken away, of a car truck bolster, brake beam, brake lever and the strut shown in Fig. 1 and showing a special form of brake lever;

Fig. 6 is a view similar to Fig. 5 where a special form of brake lever is not required;

Fig. 7 is a sectional elevation looking in the direction of the arrow, Fig. 6, and indicating the brake beam as movable at an inclination;

Fig. 8 is an elevation of the strut shown in Fig. 7;

Fig. 9 is an elevation of the strut of Fig. 8 as viewed when turned through an angle of ninety degrees; and Fig. 10 is a section on the line 10—10, Fig. 9.

Shown in Fig. 1 there is a brake beam comprising a compression member 11, a tension member 12 and a flattened end portion 13, such a beam being preferably constructed in accordance with my aforesaid application, although the improved strut forming the subject matter of the present application may be used with other types of beams which have compression and tension members, to the connected extremities of which brake heads may be applied.

Referring to Figs. 1 to 5 inclusive, the improved strut 14 may be forced into place in the position shown in Fig. 1 so that the power exerted will camber the compression member 11. The strut 14 is preferably made of a malleable casting or forging having a major member or a longitudinal body portion 15 formed with a hollow portion or housing 16 providing a longitudinal slot having a closed bottom 17. Preferably this closed bottom 17 extends part way of the length of the slot in the housing 16 and is for the purpose of forming a trap definitely disclosed in my prior application Serial No. 130,881, filed March 15, 1937.

The body portion 15 of the strut is formed at one end with a longitudinally extending cylindrical end portion 18. Preferably this end portion 18 is hollow and may be interiorly reinforced by longitudinal ribs 19, as shown in Fig. 3. These ribs extend from end to end of the hollow as indicated in broken lines in Fig. 2, and at the inner end of the hollow an opening 20 is provided for the sand core in casting, the opening being surrounded by an end wall 21. At the outer end of the hollow end portion 18 the same is closed by an inwardly curved closure portion 22 which is so shaped that it can properly engage with the inner surface of the elbow of the tension member 12. At the adjoining end of the cylindrical portion 18 a pair of spaced apart tongues 23 are provided which may be bent over upon the tension member, as shown in full lines in Fig. 2.

Formed integrally with the major or body member 15 of the strut is a jaw 24, which is set back with reference to the longitudinal axis of member 15 and the inner surface of which lies substantially at such axis, such jaw 24 having a recess 25 facing inwardly. To cooperate with the jaw 24 there is provided a minor member 26 having its recess 27 facing the recess 25 of the main jaw. Member 26 longitudinally of the strut is preferably located wholly beyond the housing 16, and the lower surface of its base portion 28 is preferably flat to extend transversely of the longitudinal axis of the strut. The inner edge of the base portion 28 is formed with an inwardly projecting shoulder 29 extending from side to side of the strut and above the shoulder 29 the member 26 is formed with a recess 30 extending from side to side thereof. Above the shoulder or rib 29 the major member 15 is formed with a shoulder or rib 31 adapted to be registered in the recess 30, for the purpose of ultimately forming an interlocking connection between member 26 and member 15. Below the base portion 28 of the smaller member, the member 15 is preferably formed with a shoulder 32 and also flat so that the base portion 28 may rest snugly upon the shoulder 32, the jaw 24 being set back to allow for the formation of the shoulder 32. It will be seen that when the member 26 is in proper cooperative position with respect to the main jaw 24, that the meeting surfaces thereof will be in snug contact so as to form a suitable recess between the two jaws.

When the strut is positioned upon the beam, the two members 15 and 26 are rigidly connected together by a rivet 34, preferably located above the inter-engaging shoulders 30, 31. Referring to Fig. 4, the housing 16 is adapted to receive a brake lever 35, shown in broken lines, so that the bottom closure 17 of the housing will be located below the lever so as to prevent the same from falling down through the strut. A pivot pin 36 passes transversely through the housing in an opening lined by bushings 33 and also through the end of the brake lever 35, it usually being held in position by a cotter pin 37.

In order that there may be no binding or danger to the pivotally connected brake lever 35 and strut 14 which might ensue because of the fact that it is preferred that the brake beam move at an angle of inclination to the horizontal, the lever 35 may be twisted somewhat, as at 35a, Fig. 5.

When the strut is to be inserted between the tension and compression members of a brake beam, the jaws 24, 26 will be engaged over the compression member and the tongues 23 engaged with the bend or elbow of the tension member. If the rivet pin 34 has not been headed up, that is now done in order to rigidly bind the strut with the beam.

Of course the brake lever 35 is operated by the usual connecting rod 38 to which the lever is pivoted by a pivot pin 39. Usually the connecting rod 44 passes through an opening in the bolster 40, Fig. 5.

In the preferred embodiment of the invention, as when it is intended that the brake beam 41 move at an angle of inclination, the strut 42 is specially constructed, preferably as shown in Figs. 6 to 10 inclusive. The usual brake lever 43 is connected with the rod 44 by a pivot pin 45, and inasmuch as the brake lever 43 is usually inclined, as shown in Fig. 7, with respect to the bolster as well as inclined laterally in the plane in which it moves, and furthermore as the brake beam is preferably inclined, a special construction of the strut is particularly desirable. In other words, the pivot pin 46 between the brake lever 43 and the strut 42 is parallel with the pivot 45, and it should so connect the brake lever with the strut that their freedom of movement is permitted.

To properly take care of such conditions, the longitudinal body portion 47 of the strut is provided with a housing 48 having a closed bottom 49 and slot 50 in the housing, the closed bottom forming a trap. The openings 17a, Fig. 2, and the openings 48a, Fig. 7, at the ends of each trap permit the escape of dirt or the like. Generally speaking the construction in these respects is the same as described with reference to Figs. 1 to 5 inclusive, but with one important difference. The housing 48 is set askew with respect to the cylindrical end portion 51 of the strut and the main jaw 52, with which the separate jaw 53 cooperates when the jaws are connected by a rivet 54. The difference resides in the fact that not only is the housing set askew of the axis of the strut, but it is arranged so that when the strut is in service in a brake beam, as shown in Fig. 7, such housing will extend substantially parallel with the connecting rod 44 of the brake mechanism and its jaw. Such a deposition of the housing also means that when the strut is in service the housing is positioned at an angle with reference to the line of movement A—A, Fig. 7, of the brake beam. The irregular or deformed shape of the strut for the construction disclosed by Figs. 7, 8 and 9 is lighter and probably about as strong as if the strut was not deformed because it has the required strength and only needs a minimum mass or weight of metal.

By referring to Figs. 8 and 9 as well as Fig. 7, it will be seen that the aforesaid skewing of the housing 48 of the strut is in two directions with reference to the longitudinal axis of the strut. The principal result is to dispose the slot 50 on a bias or slant lengthwise thereof with respect to the longitudinal axis of the strut, that is to say, the side walls of the housing 48 are inclined lengthwise with respect to the said axis. In addition, there is also an inclination or a bias of the longitudinal edges of the housing, bordering the slot, with reference to the longitudinal axis of the strut, that is to say, the edges of the walls defining the open front and the open back portions of the slot are thus inclined. Such a construction and arrangement of the housing means that the two inclinations of the housing with respect to said axis are ascertained by a quarter turn of the strut upon such axis.

It is obvious that the invention shown and described may be subject to more or less modification without departing from the scope of the appended claims.

What I claim as new is—

1. A brake beam strut having a lengthwise slot adapted to receive the end of a brake lever for a pivotal movement, such slot being longitudinally on a bias with respect to the longitudinal axis of the strut.

2. A brake beam strut having a lengthwise slot adapted to receive the end of a brake lever for a pivotal movement, the opposite side walls of such slot extending on a bias to the longitudinal axis of the strut, and the open front and open back of the slot being also on a bias to said axis.

3. A brake beam strut, comprising a housing having a lengthwise opening adapted to receive the end of a brake lever for a pivotal movement, the housing being doubly inclined along its length with respect to the longitudinal axis of the strut, that is its opposite side walls are on a slant with respect to said axis and the corresponding edge portions of the housing at the open front and open back of the slot are on another slant with respect to said axis.

4. A brake beam strut having a lengthwise slot adapted to receive the end of a brake lever for a pivotal movement, such slot being longitudinally on a bias with respect to the longitudinal axis of the strut, and a brake lever trap at the bottom of the slot.

5. In combination with a brake beam, a strut having a lengthwise slot adapted to receive the end of a brake lever for a pivotal movement, such slot being longitudinally on a bias with respect to the longitudinal axis of the strut.

6. In combination with a brake beam, a strut having a lengthwise slot adapted to receive the end of a brake lever for a pivotal movement, the opposite side walls of such slot extending on a bias to the longitudinal axis of the strut and the open front and open back of the slot being also on a bias to said axis.

7. In combination with a brake beam, a strut comprising a housing having a lengthwise opening adapted to receive the end of a brake lever for a pivotal movement, the housing being doubly inclined along its length with respect to the longitudinal axis of the strut, that is its opposite side walls are on a slant with respect to said axis and the corresponding edge portions of the housing at the open front and open back of the slot are on another slant with respect to said axis.

8. In combination with a brake beam adapted to move at an inclination to horizontal and having a strut, a connecting rod and its brake lever, the rod having a jaw, the strut having a housing or jaw in which the lever is pivoted and such housing being substantially parallel with the jaw of the connecting rod and the housing being on the bias longitudinally with respect to the longitudinal axis of the strut.

9. A brake beam adapted to be confined lengthwise by, and movable at an angle of inclination to the horizontal on, the side frames of a car truck, such beam having a strut provided with a housing or jaw which is substantially on the horizontal and is adapted to receive the end of a brake lever for a pivotal movement.

10. A brake beam strut having longitudinally extending inner walls defining an opening for receiving the end of a brake lever, such walls being longitudinally on a bias to the longitudinal axis of the strut.

11. A brake beam strut having beam engaging members at both ends and intermediately thereof a longitudinal opening, such opening having an inclination transversely of the beam engaging surfaces of said members, and the opening extending lengthwise on a bias with respect to the longitudinal axis of the strut.

12. In combination, a brake beam and its strut positioned to move forward and backward at an inclination to horizontal, a connecting rod and a brake lever pivoted thereto and to the strut, the ends of the pivot of the brake lever to the strut being located one in advance of the other longitudinally of the strut to incline such pivot toward either end of the strut.

13. In combination, a brake beam and its strut positioned to move forward and backward at an inclination to horizontal, a connecting rod and a brake lever pivoted thereto and to the strut, the openings for the pivot of the brake lever to the strut being located one in advance of the other longitudinally of the strut whereby the pivot is adapted to be inclined toward either end of the strut when positioned in the openings.

14. In combination, a brake beam and its strut positioned to move forward and backward at an inclination to horizontal, a connecting rod and a brake lever pivoted thereto and to the strut, and means mounting the pivot to the strut in a position to allow freedom of movement of the thus inclined beam by eliminating the tendency of the lever and the strut to bind.

15. The combination of a brake lever and a brake beam pivoted thereto to move breadthwise in a plane at an inclination to horizontal, the lever inclined in the plane of its movement and such plane being inclined, and the pivot end of the lever having means to prevent the binding of said end with the beam due to the plane of movement of the beam.

16. The combination of a brake lever and a trussed brake beam having its strut pivoted thereto to move the beam breadthwise in a plane at an inclination to horizontal, the lever being inclined laterally to move in a plane inclined to the vertical, and the pivot being inclined with respect to the longitudinal axis of the strut, whereby to prevent the binding of the pivoted end of the lever with the strut.

CHARLES R. BUSCH.